(12) United States Patent
Horikawa et al.

(10) Patent No.: US 11,873,048 B2
(45) Date of Patent: Jan. 16, 2024

(54) SADDLE RIDING VEHICLE

(71) Applicant: HONDA MOTOR CO., LTD., Tokyo (JP)

(72) Inventors: Haruki Horikawa, Tokyo (JP); Jumpei Yasuda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 632 days.

(21) Appl. No.: 17/011,220

(22) Filed: Sep. 3, 2020

(65) Prior Publication Data

US 2021/0078659 A1 Mar. 18, 2021

(30) Foreign Application Priority Data

Sep. 12, 2019 (JP) .................................. 2019-166184

(51) Int. Cl.
| | |
|---|---|
| *B62J 11/13* | (2020.01) |
| *B62K 19/12* | (2006.01) |
| *B62K 11/04* | (2006.01) |
| *B62J 11/19* | (2020.01) |

(52) U.S. Cl.
CPC .............. *B62J 11/13* (2020.02); *B62K 11/04* (2013.01); *B62K 19/12* (2013.01); *B62J 11/19* (2020.02)

(58) Field of Classification Search
CPC ... B62J 11/10; B62J 11/13; B62J 11/19; B62J 45/41; B62K 11/04; B62K 19/12

USPC ............................................................ 248/73
See application file for complete search history.

(56) References Cited

FOREIGN PATENT DOCUMENTS

| EP | 3281849 A1 * | 2/2018 | ............... B62H 1/02 |
|---|---|---|---|
| JP | 2014-065423 | 4/2014 | |
| JP | 2018-158669 A | 10/2018 | |

OTHER PUBLICATIONS

Japanese Office Action dated Jul. 20, 2021 with English Translation, 9 pages.

* cited by examiner

*Primary Examiner* — Lindsay M Low
*Assistant Examiner* — Omar Morales
(74) *Attorney, Agent, or Firm* — Rankin, Hill & Clark LLP

(57) ABSTRACT

A saddle riding vehicle includes a body frame and a cable. The body frame includes a main frame extending rearward from a head pipe, a seat frame extending rearward from the main frame, and a rear frame extending rearward from the main frame and connected to the seat frame. The cable is routed so as to run along the body frame. A concave portion depressed in a vehicle width direction is disposed in a connecting portion. The connecting portion connects the main frame with a front end portion of the rear frame. A plate-shaped member that covers the concave portion is disposed. The cable is routed between the concave portion and the plate-shaped member.

6 Claims, 8 Drawing Sheets

SADDLE RIDING VEHICLE

INCORPORATION BY REFERENCE

The present application claims priority under 35 U.S.C. § 119 to Japanese Patent Application No. 2019-166184 filed on Sep. 12, 2019. The content of the application is incorporated herein by reference in its entirety.

TECHNICAL FIELD

The present invention relates to a saddle riding vehicle.

BACKGROUND ART

There has been conventionally known a saddle riding vehicle in which a cable routed along a body frame is supported with a clamp disposed on a side surface of the body frame (for example, see Patent Literature 1). In Patent Literature 1, since the clamp allows reducing looseness of the cable, another component can be disposed near the cable and the vehicle can be compact.

CITATION LIST

Patent Literature

[Patent Literature 1] JP-A No. 2014-65423

SUMMARY OF INVENTION

Technical Problem

However, since the clamp protrudes from the side surface of the body frame in the conventional saddle riding vehicle, a size of a structure to support the cable is likely to be large in a vehicle width direction, and therefore a disposition of another component around the cable and compactification of the vehicle are possibly restricted.

The present invention has been made in consideration of the above-described circumstances, and its object is to ensure routing a cable compactly in a saddle riding vehicle.

Solution to Problem

A saddle riding vehicle includes a body frame (10) and a cable (53). The body frame (10) includes a main frame (16) extending rearward from a head pipe (15), a seat frame (19) extending rearward from the main frame (16), and a rear frame (20) extending rearward from the main frame (16) and connected to the seat frame (19). The cable (53) is routed so as to run along the body frame (10). A concave portion (64) depressed in a vehicle width direction is disposed in a connecting portion (55). The connecting portion (55) connects the main frame (16) with a front end portion (20a) of the rear frame (20). A plate-shaped member (65) that covers the concave portion (64) is disposed. The cable (53) is routed between the concave portion (64) and the plate-shaped member (65).

Additionally, in the above-described configuration, the concave portion (64) may be disposed in a side surface (55a) inside in the vehicle width direction.

Additionally, in the above-described configuration, the concave portion (64) may open to an upper side and a lower side.

Furthermore, in the above-described configuration, a side kickstand detecting unit (52) configured to detect a side kickstand (50) may be disposed below the concave portion (64). The cable (53) may be a cable connected to the side kickstand detecting unit (52). An endless driving force transmitting member (39) that extends below the concave portion (64) rearward from the main frame (16) side and is connected to a rear wheel (3) may be disposed. A clamp member (62, 63) that supports the cable (53) may be disposed in a region surrounded by the driving force transmitting member (39) as viewed in a side view of the vehicle.

Additionally, in the above-described configuration, the plate-shaped member (65) may include a step portion (73) that bulges in a direction opposite from a depth direction of the concave portion (64). The cable (53) may be routed between the step portion (73) and the concave portion (64).

Additionally, in the above-described configuration, the connecting portion (55) may have a substantially triangular shape tapered toward a rear side from the main frame (16) side as viewed in a side view of the vehicle. The concave portion (64) may be disposed in a front portion (55c) of the connecting portion (55).

Additionally, in the above-described configuration, the plate-shaped member (65) may support an exterior member (43).

Furthermore, in the above-described configuration, the main frame (16) may be formed in a tube shape by joining an outer frame member (66) positioned outside in the vehicle width direction and an inner frame member (67) that overlaps with the outer frame member (66) from inside in the vehicle width direction. The concave portion (64) may be a depressed part of the inner frame member (67).

Advantageous Effects of Invention

The saddle riding vehicle includes the body frame and the cable. The body frame includes the main frame extending rearward from the head pipe, the seat frame extending rearward from the main frame, and the rear frame extending rearward from the main frame and connected to the seat frame. The cable is routed so as to run along the body frame. The concave portion depressed in the vehicle width direction is disposed in the connecting portion. The connecting portion connects the main frame with the front end portion of the rear frame. The plate-shaped member that covers the concave portion is disposed. The cable is routed between the concave portion and the plate-shaped member.

With this configuration, since the cable is routed between the concave portion depressed in the vehicle width direction of the connecting portion and the plate-shaped member, the cable can be routed compactly. Additionally, even when the concave portion is disposed, since an influence to rigidity of the body frame is comparatively small, the concave portion is easily disposed in the connecting portion that connects the main frame with the front end portion of the rear frame. Furthermore, since the concave portion can be reinforced with the plate-shaped member, the rigidity of the body frame can be ensured.

Additionally, in the above-described configuration, the concave portion may be disposed in the side surface inside in the vehicle width direction.

With this configuration, the concave portion and the cable are difficult to be seen from the outside in the vehicle width direction, and therefore an appearance property is good.

Additionally, in the above-described configuration, the concave portion may open to the upper side and the lower side.

With this configuration, the cable can be routed in an up-down direction in the concave portion.

Furthermore, in the above-described configuration, the side kickstand detecting unit configured to detect the side kickstand may be disposed below the concave portion. The cable may be the cable connected to the side kickstand detecting unit. The endless driving force transmitting member that extends below the concave portion rearward from the main frame side and is connected to the rear wheel may be disposed. A clamp member that supports the cable may be disposed in the region surrounded by the driving force transmitting member as viewed in the side view of the vehicle.

With this configuration, the clamp member allows reducing a contact of the cable connected to the side kickstand detecting unit with the driving force transmitting member.

Additionally, in the above-described configuration, the plate-shaped member may include the step portion that bulges in the direction opposite from the depth direction of the concave portion. The cable may be routed between the step portion and the concave portion.

With this configuration, an interval between the concave portion and the plate-shaped member can be largely ensured with the step portion, the cable can be properly routed, and rigidity of the plate-shaped member can be increased.

Additionally, in the above-described configuration, the connecting portion may have the substantially triangular shape tapered toward the rear side from the main frame side as viewed in the side view of the vehicle. The concave portion may be disposed in the front portion of the connecting portion.

With this configuration, a rigidity balance of the body frame in the connecting portion can be satisfactory and an area to dispose the concave portion can be largely ensured in the connecting portion.

Additionally, in the above-described configuration, the plate-shaped member may support the exterior member.

With this configuration, the exterior member can be supported with the simple structure using the plate-shaped member.

Furthermore, in the above-described configuration, the main frame may be formed in the tube shape by joining the outer frame member positioned outside in the vehicle width direction and the inner frame member that overlaps with the outer frame member from the inside in the vehicle width direction. The concave portion may be the depressed part of the inner frame member.

With this configuration, by joining the outer frame member and the inner frame member together, the main frame can be easily formed in the tube shape, and the concave portion can be easily formed in the inner frame member. Additionally, the concave portion is difficult to be seen from the outside in the vehicle width direction, and therefore the appearance property is good.

DESCRIPTION OF EMBODIMENTS

The following describes an embodiment of the present invention with reference to the drawings. In the description, descriptions on directions such as front and rear, right and left, and upper and lower are identical to directions with respect to a vehicle body insofar as descriptions are not particularly given. A reference sign FR illustrated in each drawing indicates a front side of the vehicle body, a reference sign UP indicates an upper side of the vehicle body, and a reference sign LH indicates a left side of the vehicle body.

Figure 1:
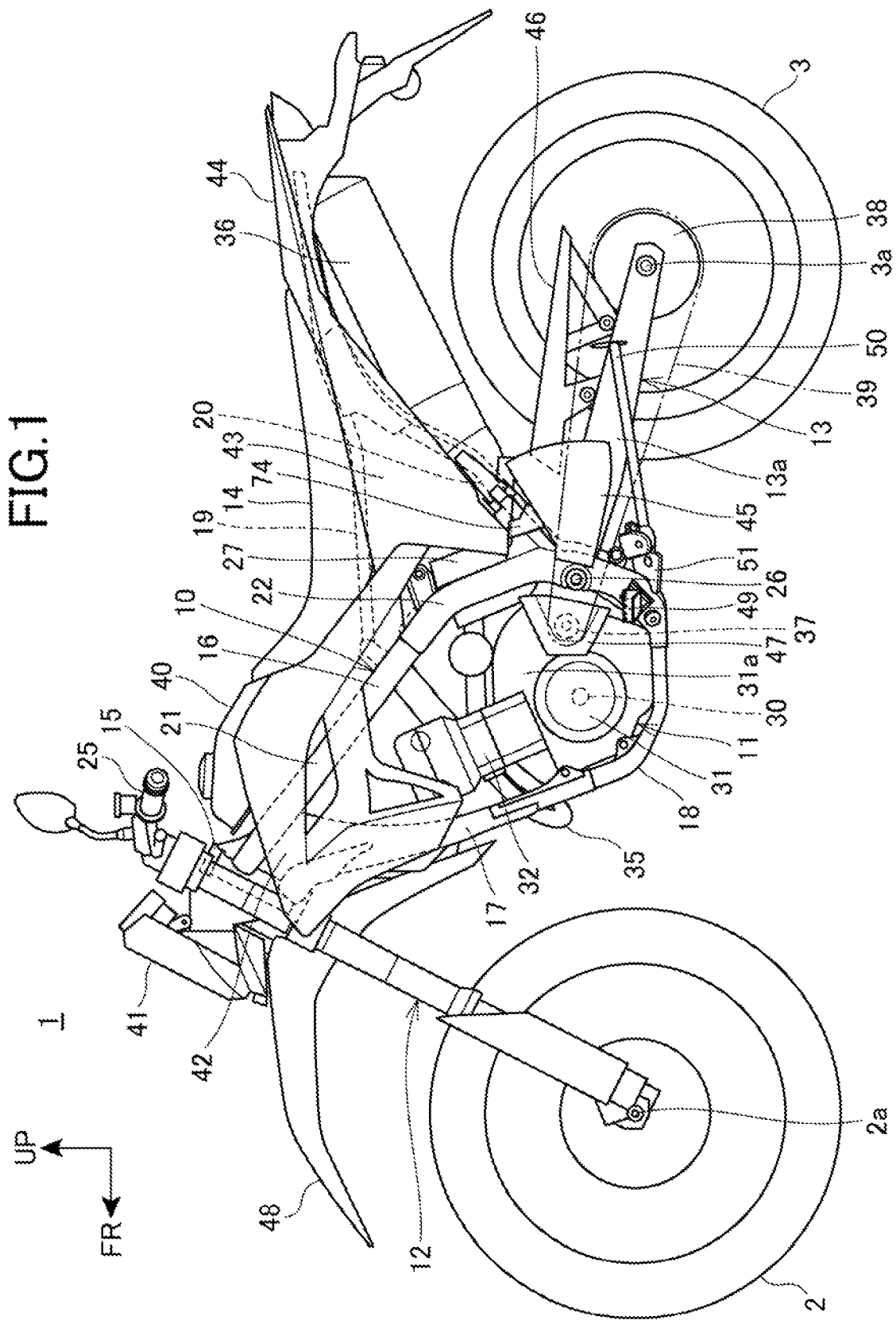
FIG. 1 is a left side view of a motorcycle according to an embodiment of the present invention.

FIG. 1 is a left side view of a motorcycle 1 according to the embodiment of the present invention.

The motorcycle 1 is a vehicle where an engine 11 as a power unit is supported to a body frame 10, a front fork 12 that steerably supports a front wheel 2 is steerably supported to a front end of the body frame 10, and a swing arm 13 is disposed on a rear portion of the body frame 10. The swing arm 13 supports a rear wheel 3.

The motorcycle 1 is a saddle riding vehicle on which an occupant is seated as straddling a seat 14. The seat 14 is disposed above the rear portion of the body frame 10.

Figure 2:
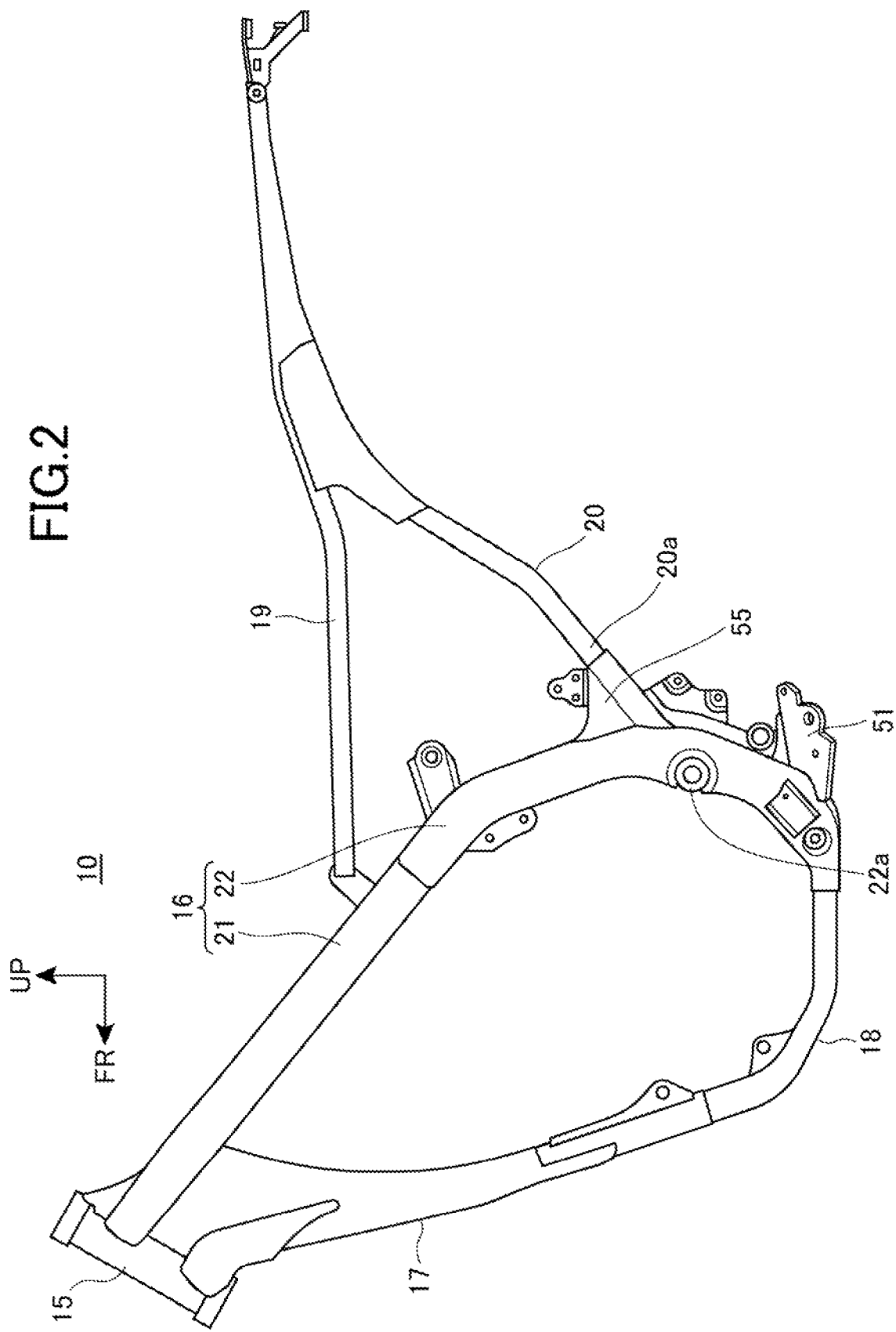
FIG. 2 is a left side view of a body frame.

FIG. 2 is a left side view of the body frame 10.

With reference to FIG. 1 and FIG. 2, the body frame 10 includes a head pipe 15, a pair of right and left main frames 16, a down frame 17, and a pair of right and left lower frames 18. The head pipe 15 is disposed on the front end of the body frame 10. The main frames 16 extend downward to the rear from the head pipe 15. The down frame 17 extends downward to the rear from the lower sides of the main frames 16 in the head pipe 15. The lower frames 18 extend rearward from the lower end portion of the down frame 17 and are each connected to the lower end portions of the right and left main frames 16.

The body frame 10 includes a pair of right and left seat frames 19, and a pair of right and left rear frames 20. The pair of right and left seat frames 19 each extend rearward from upper portions of the right and left main frames 16, and the pair of right and left rear frames 20 each extend upward to the rear from the lower portions of the right and left main frames 16 and are connected to the seat frames 19.

The head pipe 15 and the down frame 17 are positioned at a center of a vehicle width similarly to the front wheel 2.

The main frames 16 each include a main frame upper portion 21 and a pivot frame portion 22. The main frame upper portion 21 extends downward to the rear from the head pipe 15, and the pivot frame portion 22 extends downward from the lower end portion of the main frame upper portion 21.

The seat frame 19 extends rearward to be substantially horizontal from the main frame upper portion 21.

The rear frame 20 extends upward to the rear from the intermediate portion between the top and bottom of the pivot frame portion 22.

The lower frame 18 has a rear end portion connected to the lower end portion of the pivot frame portion 22.

The front fork 12 is turnably supported to the body frame 10 via a steering shaft (not illustrated) inserted through the head pipe 15. A handlebar 25 for steering is disposed on the upper end portion of the front fork 12. The front wheel 2 is journaled to an axle 2a disposed on the lower end portion of the front fork 12.

The swing arm 13 is journaled to a pivot shaft 26 supported to the right and left pivot frame portions 22. The pivot shaft 26 extends horizontally in a vehicle width direction.

The swing arm 13 includes a pair of right and left arm portions 13a and a cross member (not illustrated). The pair of right and left arm portions 13a extend in a vehicle front-rear direction on right and left of the rear wheel 3. The cross member (not illustrated) connects the right and left arm portions 13a in front of the rear wheel 3.

In the swing arm 13, front end portions of the arm portions 13a disposed between the right and left pivot frame portions 22 are journaled to the pivot shaft 26 and swing up and down around the pivot shaft 26.

The rear wheel 3 is journaled to an axle 3a disposed on rear end portions of the right and left arm portions 13a.

The motorcycle 1 includes a rear suspension 27 bridged between the front portion of the swing arm 13 and the body frame 10.

The engine 11 is disposed between the down frame 17 and the pivot frame portions 22 in the vehicle front-rear direction below the main frame upper portions 21 and fixed to the body frame 10.

The engine 11 includes a crankcase 31 and a cylinder portion 32. The crankcase 31 supports a crankshaft 30, which horizontally extends in the vehicle width direction (right-left direction). The cylinder portion 32 is disposed on the upper portion of the front portion of the crankcase 31.

An exhaust pipe 35 of the engine 11 is pulled out downward from an exhaust port in the front surface of the cylinder portion 32 and extends rearward. A muffler 36 is disposed above the rear wheel 3 in the rear portion of the motorcycle 1 and connected to the rear end of the exhaust pipe 35.

The rear portion of the crankcase 31 is a transmission case portion 31a that houses a transmission. An output from the engine 11 is transmitted to the rear wheel 3 by a driving force transmitting member 39 that connects a drive sprocket 37 disposed on an output shaft of the transmission and a driven sprocket 38 of the rear wheel 3.

A fuel tank 40 is disposed above the main frames 16 and between the head pipe 15 and the seat 14.

The motorcycle 1 includes a front cover 41 that covers the head pipe 15 from the front side, a pair of right and left front side covers 42 that cover the upper portion of the front portion of the body frame 10 and the fuel tank 40 from sides, a pair of right and left rear side covers 43 that cover the vehicle body below the seat 14 from sides, a rear cover 44 that covers the vehicle body at the rear of the seat 14 from upward, and a guard member 45 that covers the front portion of the swing arm 13 and the driving force transmitting member 39 from a side at the rear of the pivot shaft 26.

The motorcycle 1 includes a chain cover 46 that covers the upper portion of the driving force transmitting member 39 from an outer lateral side and upward, and a sprocket cover 47 that covers the drive sprocket 37 from a side.

A front fender 48 that covers the front wheel 2 from above is mounted to the front fork 12.

A pair of right and left steps 49 on which the occupant seated on the seat 14 places feet are mounted to lower end portions of the right and left pivot frame portions 22.

A side kickstand 50 that supports the motorcycle 1 during parking is supported to a stay 51 that extends rearward from the lower end portion of the pivot frame portion 22 on one of the right and left sides (left side). The side kickstand 50 is disposed downward of the swing arm 13.

Figure 3:
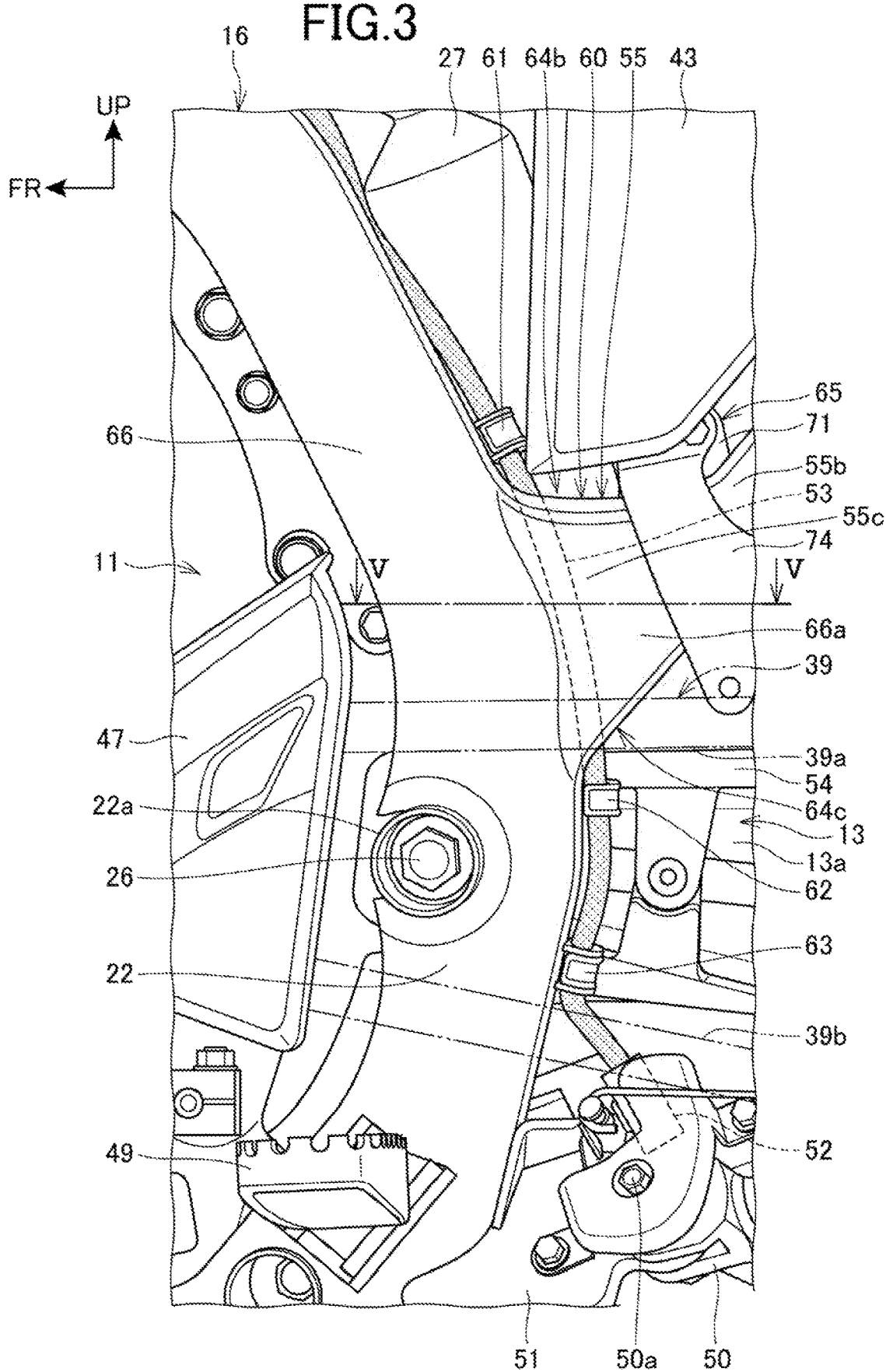
FIG. 3 is a side view when a peripheral portion of a pivot frame portion on a left side is viewed in outside in a vehicle width direction.

FIG. 3 is a side view when a peripheral portion of the pivot frame portion 22 on the left side is viewed in the outside in the vehicle width direction.

With reference to FIG. 3, the side kickstand 50 is supported to the stay 51 via a turning shaft 50a inserted through the front end portion of the side kickstand 50. The side kickstand 50 changes between a parking state in which the side kickstand 50 extends downward and is grounded and a housing state in which the side kickstand 50 extends upward to the rear as in FIG. 1 and is housed in the vehicle body side through turning around the turning shaft 50a.

A side kickstand detecting unit 52 that detects the side kickstand 50 is connected to the front end portion of the side kickstand 50. The side kickstand detecting unit 52 is a switch (electric component) that detects the parking state and the housing state of the side kickstand 50. The side kickstand detecting unit 52 is disposed rearward of the lower end portion of the pivot frame portion 22 on the left side and below the arm portion 13a on the left side.

A cable 53 connected to the side kickstand detecting unit 52 is routed in an up-down direction along the pivot frame portion 22 on the left side. The cable 53 extends upward from the side kickstand detecting unit 52 so as to run along the rear portion of the pivot frame portion 22 on the left side and is connected to a control unit (not illustrated) that electrically controls the motorcycle 1.

The driving force transmitting member 39 is an endless chain that extends inside in the vehicle width direction of the pivot frame portion 22 on the left side and outside in the vehicle width direction of the rear wheel 3 in the vehicle front-rear direction. Note that the driving force transmitting member 39 may be an endless belt.

An upper portion 39a of the driving force transmitting member 39 passes through above the upper surface of the arm portion 13a on the left side, and a lower portion 39b of the driving force transmitting member 39 passes through below the lower surface of the arm portion 13a on the left side.

On the upper surface and the lower surface of the arm portion 13a on the left side, a chain slider 54 extending in the vehicle front-rear direction is mounted. The chain slider 54 protects the arm portion 13a on the left side from the driving force transmitting member 39.

Figure 4:
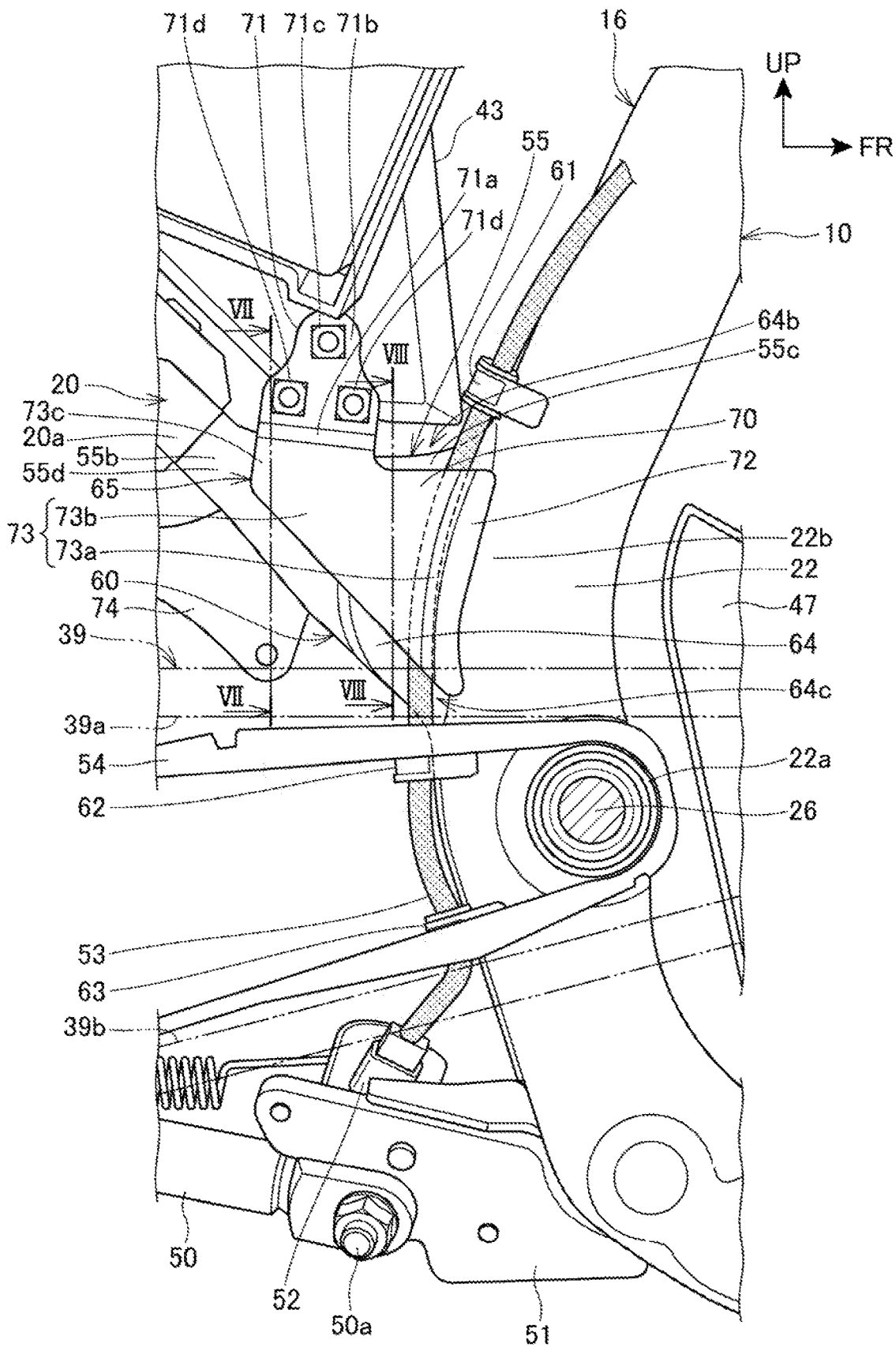
FIG. 4 is a side view when the peripheral portion of the pivot frame portion on the left side is viewed in inside in the vehicle width direction.

FIG. 4 is a side view when the peripheral portion of the pivot frame portion 22 on the left side is viewed in the inside in the vehicle width direction. Here, FIG. 4 does not illustrate the swing arm 13.

With reference to FIG. 3 and FIG. 4, the pivot frame portion 22 of the main frame 16 includes a connecting portion 55 to which the front end portion 20a of the rear frame 20 is connected.

As viewed in the side view of the vehicle, the connecting portion 55 protrudes rearward from the rear portion of the pivot frame portion 22. As viewed in the side view of the vehicle, the connecting portion 55 is formed in a substantially triangular shape tapered toward the rear from the pivot frame portion 22 side. The connecting portion 55 is disposed at the intermediate portion between the top and bottom of the pivot frame portion 22 and positioned rearward above a pivot supporting hole portion 22a through which the pivot shaft 26 is inserted in the pivot frame portion 22.

The connecting portion 55 includes a cable supporting portion 60 that supports the cable 53.

Additionally, an upper side clamp member 61 that supports the cable 53 is disposed above the cable supporting portion 60 in the pivot frame portion 22. Lower side clamp members 62, 63 (clamp members) that support the cable 53 are disposed below the cable supporting portion 60 in the pivot frame portion 22.

Figure 5:
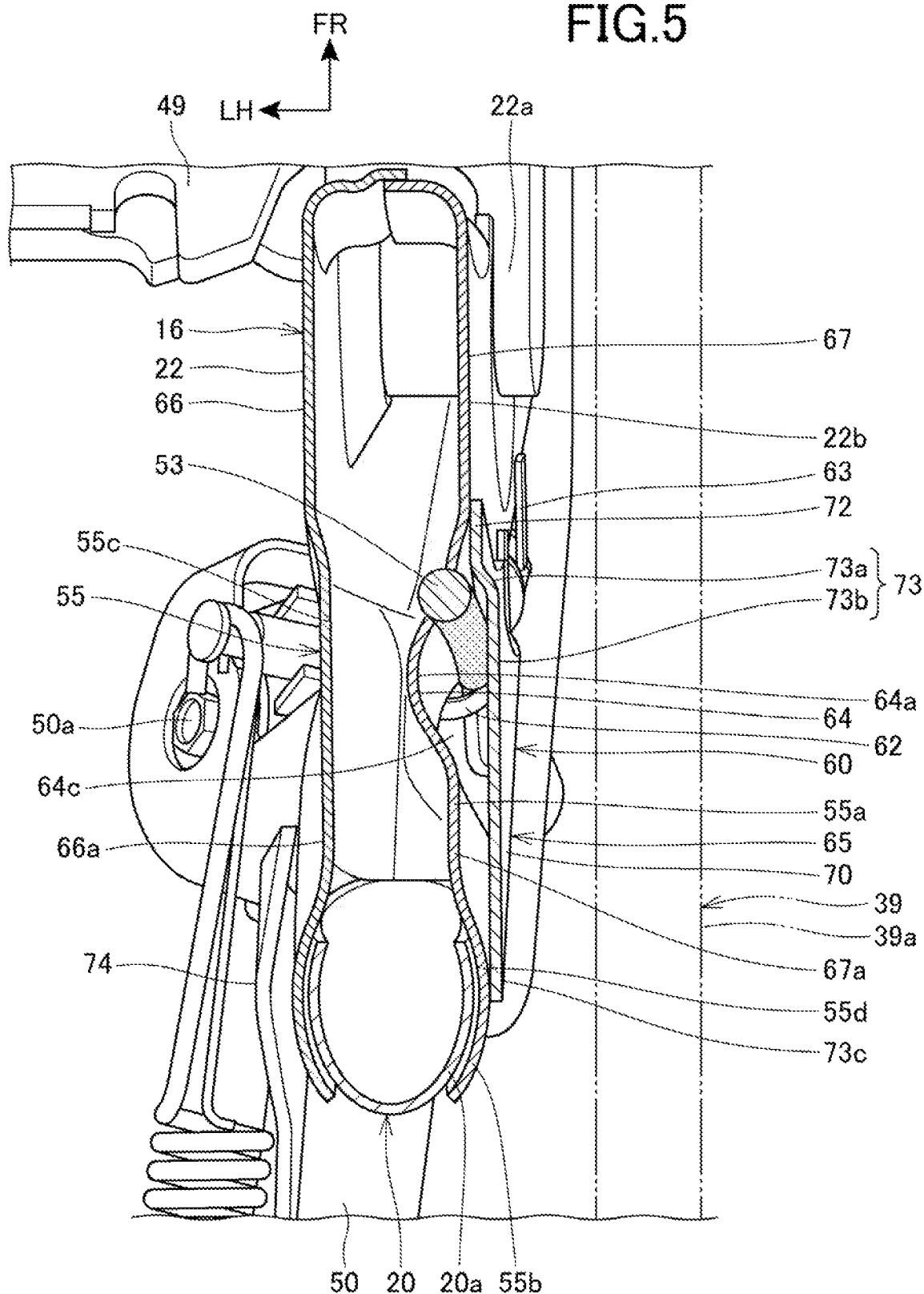
FIG. 5 is a cross-sectional view along V-V in FIG. 3.
Figure 6:
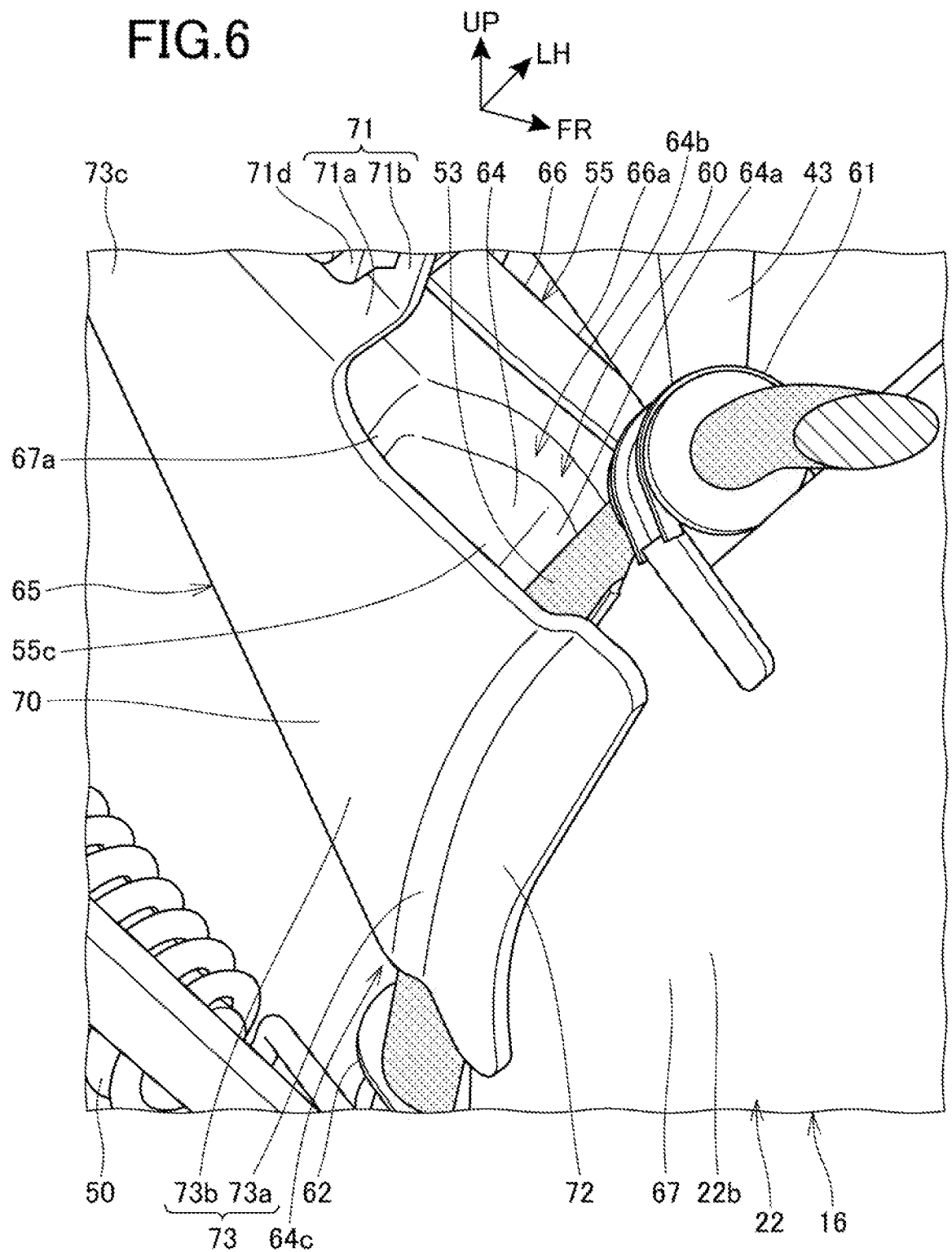
FIG. 6 is a perspective view when a cable supporting portion is viewed in the inside in the vehicle width direction.
Figure 7:
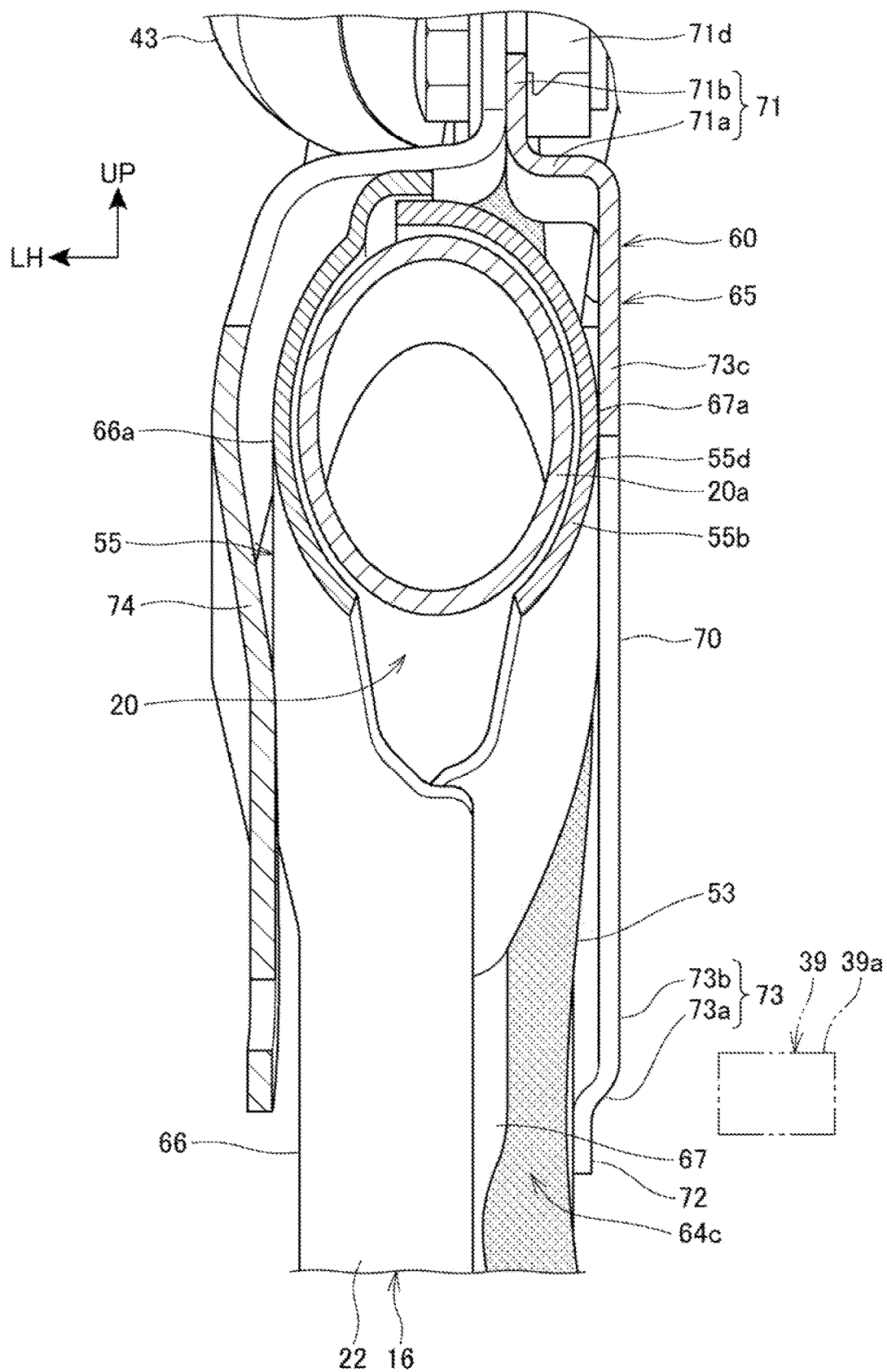
FIG. 7 is a cross-sectional view along VII-VII in FIG. 4.
Figure 8:
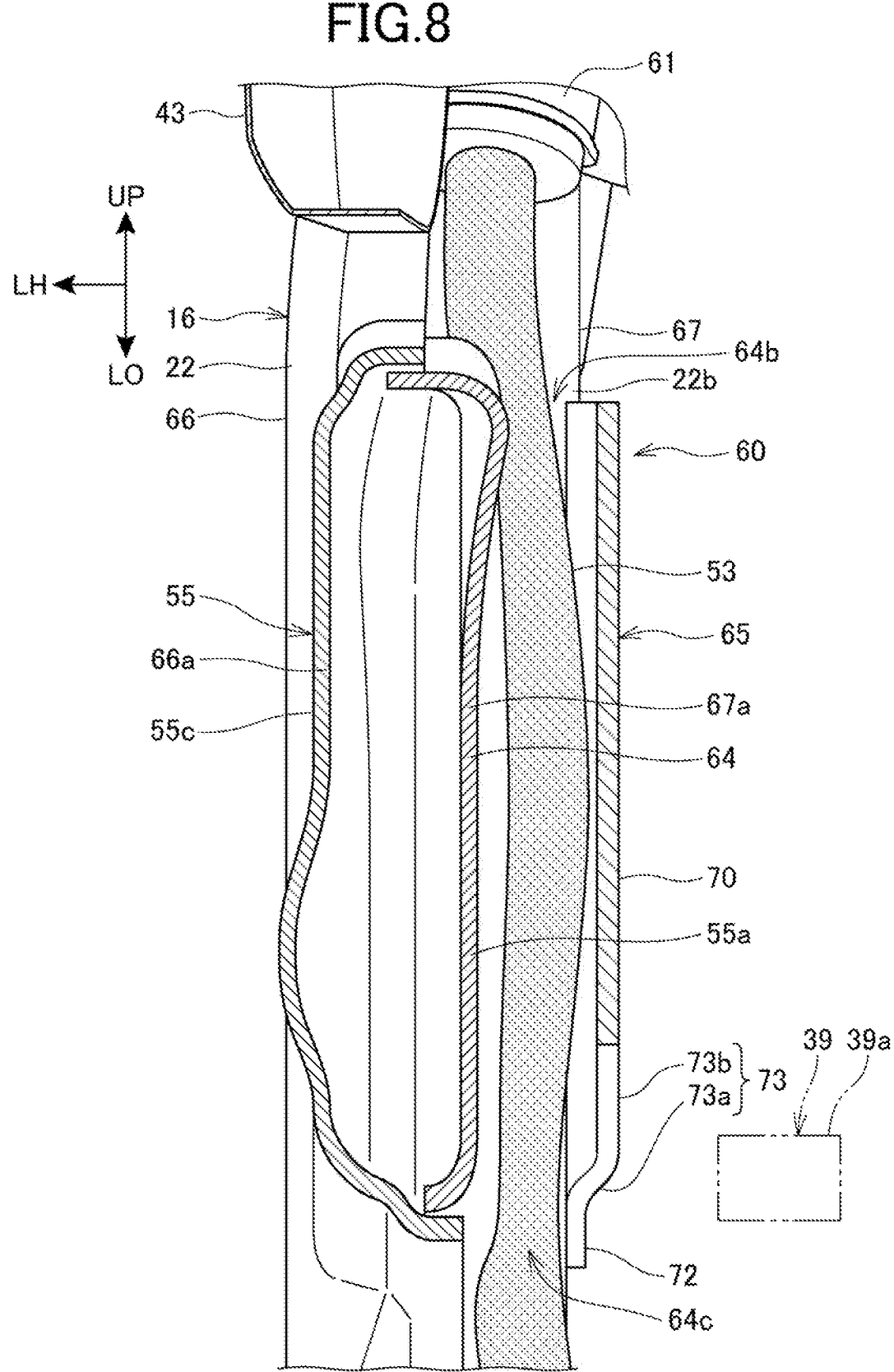
FIG. 8 is a cross-sectional view along VIII-VIII in FIG. 4.

FIG. 5 is a cross-sectional view along V-V in FIG. 3 and illustrates a cross-sectional surface passing through the cable supporting portion 60. FIG. 6 is a perspective view when the cable supporting portion 60 is viewed in the inside in the vehicle width direction. FIG. 7 is a cross-sectional view along VII-VII in FIG. 4. FIG. 8 is a cross-sectional view along VIII-VIII in FIG. 4. Here, FIG. 8 denotes a direction indicating the lower side of the vehicle body by reference numeral LO.

With reference to FIG. 3 to FIG. 8, the cable supporting portion 60 includes a concave portion 64 and a plate-shaped member 65. At the concave portion 64, a side surface 55a inside in the vehicle width direction of the connecting portion 55 is depressed outside in the vehicle width direction. The plate-shaped member 65 covers the concave portion 64 from the inside in the vehicle width direction. The cable 53 is routed in a space between the concave portion 64 and the plate-shaped member 65.

The pivot frame portion 22 is formed in a tube shape by joining an outer frame member 66 and an inner frame member 67 in the vehicle width direction. The outer frame member 66 forms a substantially half of the pivot frame portion 22 outside in the vehicle width direction. The inner frame member 67 forms a substantially half of the pivot frame portion 22 inside in the vehicle width direction.

The outer frame member 66 and the inner frame member 67 are each formed by performing presswork on a plate material.

The outer frame member 66 integrally includes an outer portion 66a that constitutes a part of the connecting portion 55 outside in the vehicle width direction. The inner frame member 67 integrally includes an inner portion 67a that constitutes a part of the connecting portion 55 inside in the vehicle width direction.

The pivot frame portion 22 has a tube shape inside of which is hollow. The inside of the connecting portion 55 is also hollow, and this hollow portion communicates with the hollow portion in the pivot frame portion 22.

As viewed in the side view of the vehicle, one apex portion of the connecting portion 55 having the substantially triangular shape is positioned at the rear end portion of the connecting portion 55, and a tubular portion 55b into which the front end portion 20a of the rear frame 20 is inserted from the rear is disposed on the rear end portion of the connecting portion 55. The tubular portion 55b communicates with the hollow portion in the connecting portion 55.

The front end portion 20a of the rear frame 20 fitted to the tubular portion 55b is joined to the connecting portion 55 by welding. The rear frame 20 is a pipe having a circular shape in the cross section.

The concave portion 64 is a part where the inner portion 67a of the inner frame member 67 is depressed outside in the vehicle width direction. That is, the side surface 55a where the concave portion 64 is disposed is the inner portion 67a.

The concave portion 64 is a part where the side surface 55a is depressed in an arc shape outside in the vehicle width direction. The concave portion 64 extends in the up-down direction in the side surface 55a. The concave portion 64 includes an upper open portion 64b that opens upward on the upper end of the concave portion 64 and a lower open portion 64c that opens downward on the lower end of the concave portion 64.

The concave portion 64 is disposed in a front portion 55c of the connecting portion 55 having the substantially triangular shape tapered toward the rear as viewed in the side view of the vehicle. In view of this, a vertical length of the concave portion 64 can be largely ensured.

The concave portion 64 is positioned between the pivot frame portion 22 and the tubular portion 55b in the vehicle front-rear direction. As illustrated in FIG. 5, a bottom portion 64a of the concave portion 64 is positioned further outside in the vehicle width direction than an inner surface portion 22b in the vehicle width direction of the pivot frame portion 22 and an inner surface portion 55d in the vehicle width direction of the tubular portion 55b.

The plate-shaped member 65 is disposed such that its plate thickness direction is oriented in the vehicle width direction.

The plate-shaped member 65 integrally includes a support wall portion 70 that covers the concave portion 64 from the inside in the vehicle width direction and a stay portion 71 that extends from the support wall portion 70 upward of the connecting portion 55.

The support wall portion 70 is formed to have a substantially triangular shape according to the shape of the connecting portion 55 having the substantially triangular shape as viewed in the side view of the vehicle. The support wall portion 70 has a substantially triangular shape tapered toward the rear side.

The support wall portion 70 has a size smaller than that of the connecting portion 55 as viewed in the side view of the vehicle and is hidden to the inside of the connecting portion 55 as viewed in the side view of the vehicle.

The support wall portion 70 includes a joining portion 72 and a step portion 73. The joining portion 72 is joined to the inner surface portion 22b of the pivot frame portion 22. The step portion 73 bulges inside in the vehicle width direction from the joining portion 72. The step portion 73 is formed by bending the plate material of the plate-shaped member 65 and bulges in the vehicle width direction in the direction opposite from the depth direction of the concave portion 64.

The joining portion 72 is disposed over the substantially whole front edge extending up and down of the support wall portion 70 having the substantially triangular shape. The joining portion 72 is joined to the rear edge portion of the inner surface portion 22b.

The step portion 73 includes an inward extending portion 73a that is disposed upright inside in the vehicle width direction from the rear edge of the joining portion 72 and a rearward extending portion 73b that extends rearward from the inner edge of the inward extending portion 73a. The rearward extending portion 73b extends rearward substantially parallel to the connecting portion 55.

A rear end portion 73c of the rearward extending portion 73b is joined to the side surface 55a at a position rearward of the concave portion 64. That is, the plate-shaped member 65 is joined to the pivot frame portion 22 and the connecting portion 55 with the joining portion 72 and the rear end portion 73c, which are positioned on the front and the rear of the concave portion 64.

The stay portion 71 includes an outward extending portion 71a that extends outside in the vehicle width direction from the upper edge of the rearward extending portion 73b and an upward extending portion 71b that extends upward from the outward extending portion 71a.

As viewed in the side view of the vehicle, the stay portion 71 is positioned upward of the connecting portion 55 and between the pivot frame portion 22 and the rear frame 20.

On the upper portion of the upward extending portion 71b, a cover fastening portion 71c with which the lower portion of the rear side cover 43 is fastened is disposed. The rear side cover 43 is an exterior member visually perceived under exposure to the outside as viewed in the side view of the vehicle.

A fastening portion 71d with which a plate-shaped bracket 74 is fastened is disposed below the cover fastening portion 71c in the upward extending portion 71b. The bracket 74 passes through the outside in the vehicle width direction of the connecting portion 55 from the fastening portion 71d and extends below the connecting portion 55. The upper portion of the guard member 45 (FIG. 1) is fastened to the lower end portion of the bracket 74.

The cable 53 at the part of the connecting portion 55 is supported between the concave portion 64, which is disposed in the side surface 55a inside in the vehicle width direction of the connecting portion 55, and the plate-shaped member 65, which covers the concave portion 64. In view of this, the cable supporting portion 60 can be disposed compactly in the vehicle width direction.

The cable 53 passes through the upper open portion 64b and the lower open portion 64c of the concave portion 64 to be routed up and down of the cable supporting portion 60.

The cable 53 is routed between the concave portion 64 and the step portion 73 of the plate-shaped member 65. This allows increasing an interval between the concave portion 64 and the plate-shaped member 65 and a space through which the cable 53 passes can be largely ensured.

The upper side clamp member 61 and the lower side clamp members 62, 63 have hook shapes that extend rearward and outside in the vehicle width direction of the pivot frame portion 22 from the inner surface portion 22b in the vehicle width direction of the pivot frame portion 22. In view of this, the cable 53 can be supported with the upper side clamp member 61 and the lower side clamp members 62, 63 compact in the vehicle width direction on the upward and downward of the cable supporting portion 60.

With reference to FIG. 3 and FIG. 4, as viewed in the side view of the vehicle, the lower side clamp members 62, 63 are positioned between the upper portion 39a and the lower portion 39b of the driving force transmitting member 39 and disposed in the region surrounded by the driving force transmitting member 39 below the concave portion 64. Accordingly, the cable 53 is supported by the lower side clamp members 62, 63 at the positions close to the driving force transmitting member 39. In view of this, a clearance between the driving force transmitting member 39 and the cable 53 can be appropriately ensured.

As described above, according to the embodiment to which the present invention is applied, the motorcycle 1 includes the body frame 10 and the cable 53. The body frame 10 includes the main frame 16 extending rearward from the head pipe 15, the seat frame 19 extending rearward from the main frame 16, and the rear frame 20 extending rearward from the main frame 16 and connected to the seat frame 19. The cable 53 is routed so as to run along the body frame 10. The concave portion 64 depressed in the vehicle width direction is disposed in the connecting portion 55. The connecting portion 55 connects the main frame 16 with the front end portion 20a of the rear frame 20. The plate-shaped member 65 that covers the concave portion 64 is disposed. The cable 53 is routed between the concave portion 64 and the plate-shaped member 65.

With this configuration, since the cable 53 is routed between the concave portion 64 depressed in the vehicle width direction of the connecting portion 55 and the plate-shaped member 65, the cable 53 can be routed compactly. Additionally, even when the concave portion 64 is disposed, since an influence to the rigidity of the body frame 10 is comparatively small, the concave portion 64 is easily disposed in the connecting portion 55 that connects the main frame 16 with the front end portion 20a of the rear frame 20. Furthermore, since the concave portion 64 can be reinforced with the plate-shaped member 65, the rigidity of the body frame 10 can be ensured.

Additionally, the concave portion 64 is disposed in the side surface 55a inside in the vehicle width direction.

With this configuration, the concave portion 64 and the cable 53 are difficult to be seen from the outside in the vehicle width direction, and therefore an appearance property is good.

The concave portion 64 opens to the upper side and the lower side.

With this configuration, the cable 53 can be routed in the up-down direction in the concave portion 64.

Furthermore, the side kickstand detecting unit 52 configured to detect the side kickstand 50 is disposed below the concave portion 64. The cable 53 is a cable connected to the side kickstand detecting unit 52. The endless driving force transmitting member 39 that extends below the concave portion 64 rearward from the main frame 16 side and is connected to the rear wheel 3 is disposed. The lower side clamp members 62, 63 that support the cable 53 are disposed in the region surrounded by the driving force transmitting member 39 as viewed in the side view of the vehicle.

With this configuration, the lower side clamp members 62, 63 allow reducing a contact of the cable 53 connected to the side kickstand detecting unit 52 with the driving force transmitting member 39.

Additionally, the plate-shaped member 65 includes the step portion 73 that bulges in the direction opposite from the depth direction of the concave portion 64. The cable 53 is routed between the step portion 73 and the concave portion 64.

With this configuration, the interval between the concave portion 64 and the plate-shaped member 65 can be largely ensured with the step portion 73, the cable 53 can be properly routed, and the rigidity of the plate-shaped member 65 can be increased with the step portion 73.

Further, the connecting portion 55 has the substantially triangular shape tapered toward the rear side from the main frame 16 side as viewed in the side view of the vehicle. The concave portion 64 is disposed in the front portion 55c of the connecting portion 55.

With this configuration, a rigidity balance of the body frame 10 in the connecting portion 55 can be satisfactory by configuring such that the rigidity of the connecting portion 55 decreases toward the rear side and an area to dispose the concave portion 64 can be largely ensured in the connecting portion 55.

Additionally, the plate-shaped member 65 supports the rear side cover 43 as the exterior member.

With this configuration, the rear side cover 43 can be supported with the simple structure using the plate-shaped member 65.

Furthermore, the main frame 16 is formed in the tube shape by joining the outer frame member 66 positioned outside in the vehicle width direction and the inner frame member 67 that overlaps with the outer frame member 66 from the inside in the vehicle width direction. The concave portion 64 is the depressed part of the inner frame member 67.

With this configuration, by joining the outer frame member 66 and the inner frame member 67 together, the main frame 16 can be easily formed in the tube shape, and the concave portion 64 can be easily formed in the inner frame member 67. Additionally, the concave portion 64 is difficult to be seen from the outside in the vehicle width direction, and therefore the appearance property is good.

Note that the above-described embodiments are given to illustrate an aspect to which the present invention is applied, and the present invention is not limited to the above-described embodiment.

While it has been described that the concave portion 64 is disposed in the side surface 55a inside in the vehicle width direction of the connecting portion 55 in the embodiment, the present invention is not limited to this configuration. The concave portion may be disposed in the side surface outside in the vehicle width direction of the connecting portion 55, and this concave portion may be covered with the plate-shaped member.

While the description has been given with the example of the cable 53 connected to the side kickstand detecting unit 52 as the cable in the embodiment, the present invention is not limited to this configuration. The cable only needs to have a long linear shape. Examples of the cable include an electric wire connected to an electric component different from the side kickstand detecting unit 52, a wire used for an operation or the like, and a pipe, such as a hose.

While the description has been given with the example of the rear side cover 43 as the exterior member in the embodiment, the present invention is not limited to this configuration. The exterior member only needs to be a member exposed to the outside of the vehicle body and may be, for example, a cowl that covers the vehicle body and a guard member that protects the vehicle body or the like.

Further, while the description has been given with the motorcycle 1 as the example in the embodiment, the present invention is not limited to this configuration. The present invention is also applicable to a three-wheeled vehicle including two front wheels or rear wheels or a saddle riding vehicle including four or more wheels.

REFERENCE SIGNS LIST

1 . . . Motorcycle (saddle riding vehicle)
3 . . . Rear wheel
10 . . . Body frame
15 . . . Head pipe
16 . . . Main frame
19 . . . Seat frame
20 . . . Rear frame
20a . . . Front end portion
39 . . . Driving force transmitting member
43 . . . Rear side cover (exterior member)
50 . . . Side kickstand
52 . . . Side kickstand detecting unit
53 . . . Cable
55 . . . Connecting portion
55a . . . Side surface
55c . . . Front portion
62, 63 . . . Lower side clamp member (clamp member)
64 . . . Concave portion
65 . . . Plate-shaped member
66 . . . Outer frame member
67 . . . Inner frame member
73 . . . Step portion

The invention claimed is:

1. A saddle riding vehicle comprising:
a body frame,
the body frame including: a main frame extending rearward from a head pipe; a seat frame extending rearward from the main frame; and a rear frame extending rearward from the main frame and connected to the seat frame; and
a cable routed so as to run along the body frame, wherein
the main frame includes a pivot frame portion which is formed in a tube shape by joining an outer frame member positioned outside in the vehicle width direction and an inner frame member that overlaps with the outer frame member from inside in the vehicle width direction,
a connecting portion, which protrudes rearward from a rear portion of the pivot frame portion, is formed in a substantially triangular shape and connects the main frame with a front end portion of the rear frame,
a concave portion depressed in the vehicle width direction is disposed in an inner portion of the connecting portion,
a plate-shaped member covers the concave portion from an inside in the vehicle width direction, and
the cable is routed between the concave portion and the plate-shaped member.

2. The saddle riding vehicle according to claim 1, wherein the concave portion is disposed in a side surface inside in the vehicle width direction.

3. The saddle riding vehicle according to claim 1, wherein a side kickstand detecting unit configured to detect a side kickstand is disposed below the concave portion,
the cable is a cable connected to the side kickstand detecting unit,
an endless driving force transmitting member that extends below the concave portion rearward from the main frame side and is connected to a rear wheel is disposed, and
a clamp member that supports the cable is disposed in a region surrounded by the driving force transmitting member as viewed in a side view of the vehicle.

4. The saddle riding vehicle according to claim 1, wherein the plate-shaped member includes a step portion that bulges in a direction opposite from a depth direction of the concave portion, the cable being routed between the step portion and the concave portion.

5. The saddle riding vehicle according to claim 1, wherein the connecting portion has a substantially triangular shape tapered toward a rear side from the main frame side as viewed in a side view of the vehicle, the concave portion being disposed in a front portion of the connecting portion.

6. The saddle riding vehicle according to claim 1, wherein the plate-shaped member supports an exterior member.

* * * * *